United States Patent [19]
Vesley et al.

[11] Patent Number: 4,780,491
[45] Date of Patent: Oct. 25, 1988

[54] MICROBUBBLE-FILLED ARTICLE

[75] Inventors: George F. Vesley, Hudson; Alan H. Paulson, River Falls, both of Wis.

[73] Assignee: Minnesota Mining and Manufacturing Company, St. Paul, Minn.

[21] Appl. No.: 12,383

[22] Filed: Feb. 9, 1987

Related U.S. Application Data

[62] Division of Ser. No. 737,524, May 24, 1985, Pat. No. 4,666,771.

[51] Int. Cl.$^4$ ............................................. C08J 9/32
[52] U.S. Cl. .................................. 523/219; 428/325; 428/328; 428/329; 428/330; 428/355; 428/402; 428/406; 428/704
[58] Field of Search ............... 428/402, 406, 325, 328, 428/329, 330, 355, 704; 523/219

[56] References Cited

U.S. PATENT DOCUMENTS

| Re. 24,906 | 12/1960 | Ulrich | 206/59 |
| 3,365,315 | 1/1968 | Beck et al. | 106/40 |
| 4,223,067 | 9/1980 | Levens | 428/308 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,391,646 | 7/1983 | Howell | 106/97 |
| 4,415,615 | 11/1983 | Esmay et al. | 428/40 |
| 4,618,525 | 10/1986 | Chamberlain et al. | 523/219 |
| 4,666,771 | 5/1987 | Vesley et al. | 428/402 |

Primary Examiner—John E. Kittle
Assistant Examiner—P. R. Schwartz
Attorney, Agent, or Firm—Donald M. Sell; Richard E. Brink; Darla P. Neaveill

[57] ABSTRACT

The invention primarily concerns a pressure-sensitive adhesive tape, the adhesive layer of which is filled with glass microbubbles and has a dark appearance by virtue of (1) the microbubbles are stained glass which preferably is dark, and (2) dispersed throughout the adhesive layer is a pigment or dye which preferably is dark. More broadly, the invention concerns any coherent article filled with stained-glass microbubbles. The glass of the microbubbles preferably has an ultraviolet window, permitting the article to be made by photopolymerizing a matrix filled with the microbubbles.

4 Claims, No Drawings

MICROBUBBLE-FILLED ARTICLE

This is a division of application Ser. No. 737,524 filed May 24, 1985, U.S. Pat. No. 4,666,771.

FIELD OF THE INVENTION

The invention primarily concerns pressure-sensitive adhesive tape, the adhesive layer of which contains glass microbubbles as taught in U.S. Pat. No. 4,223,067 (Levens). More broadly, the invention concerns any normally transparent article filled with glass microbubbles.

BACKGROUND ART

Foam-backed pressure-sensitive adhesive tape is commonly used to adhere an article to a substrate. The foam backings of such tapes often are pigmented with carbon black to camouflage their presence.

The above-cited Levens patent discloses a pressure-sensitive adhesive tape which has a foamlike appearance and character, even though it is not a foam, and is useful for purposes previously requiring a foam-backed pressure-sensitive adhesive tape. A foamlike tape of the Levens patent now on the market is made by ultraviolet polymerization of a layer of an adhesive-forming mixture containing colorless glass microbubbles which afford a white color that makes the tape undesirably visible in uses such as sealing a skylight or attaching body-side moldings to automotive vehicles or simulated mullion bars to a glass window. Because of its superior performance characteristics, the foamlike tape of the Levens patent is often preferred to foam-backed tapes for such purposes and would be more acceptable if its adhesive layer were sufficiently dark to camouflage the tape. If carbon black or other pigment were added to the photopolymerizable adhesive-forming mixture in amounts sufficient to produce a desirably dark appearance, this would block the ultraviolet radiation from polymerizing the mixture to a pressure-sensitive adhesive state. Up to about 0.1 or 0.15 percent by weight of carbon black has been employed without undue interference with the polymerization of a 1-mm layer, but this results in a pastel gray color that would be undesirably noticeable for most uses such as those mentioned above.

Glass microbubbles also are used as fillers for other polymeric articles to which they afford lighter weight in addition to advantages provided by other inert fillers, e.g., higher distortion temperatures. Lighter weight is of special importance to automotive body parts. Such body parts should be pigmented internally and should effectively mask from view the mechanisms which they cover.

DISCLOSURE OF THE INVENTION

The invention primarily concerns a pressure-sensitive adhesive tape which is equivalent in performance to the tape of U.S. Pat. No. 4,223,067 (here called the "Levens tape") and also can have a sufficently dark appearance to meet the needs mentioned above. Like the Levens tape, the pressure-sensitive adhesive tape of the invention comprises a pressure-sensitive adhesive layer which preferably has a thickness exceeding 0.2 mm and consists essentially of a polymeric pressure-sensitive adhesive matrix and glass microbubbles of an average density (ASTM D-2840-69) not exceeding 1.0 g/cm$^3$, which microbubbles are dispersed throughout and comprise at least 5% by volume of the adhesive layer. Also like the Levens tape, the adhesive preferably is polymerized by ultraviolet radiation.

The tape of the invention differs from the Levens tape in that (1) the microbubbles are stained glass (i.e., colored by metallic oxides), which glass preferably has an ultraviolet window and a dark color, and (2) dispersed throughout the adhesive matrix is a pigment or dye which preferably is dark. Dark stained-glass microbubbles, in proportions permitting ultraviolet polymerization, do not by themselves give the Levens tape a sufficiently dark appearance for most uses. Neither can dark pigment or dye by itself provide an ultraviolet-polymerized Levens tape that is sufficiently dark for most purposes, as noted above. However, dark stained-glass microbubbles and dark pigment or dye together afford a surprisingly dark appearance without interfering with the polymerization of the adhesive matrix under ultraviolet exposures used in preferred examples of the Levens tape as reported in U.S. Pat. No. 4,223,067.

In a broader sense, the invention concerns any coherent article comprising a matrix filled with stained-glass microbubbles comprising at least 5% by volume of the article. Such an article of the invention differs from the prior art in the same way that the aforementioned pressure-sensitive adhesive tape of the invention differs from the Levens tape.

Furthermore, it is believed that stained-glass microbubbles are themselves new, especially when their glass has an ultraviolet window which permits the microbubbles to be incorporated into a matrix that is to be photopolymerized. In the absence of any pigment or dye, stained-glass microbubbles afford surprisingly effective opacity.

Glass microbubbles can be made according to U.S. Pat. Nos. 3,365,315 (Beck et al.) or 4,391,646 (Howell), but it is believed that all of the metal oxides as used in the working examples of those patents result in colorless microbubbles. To obtain stained-glass microbubbles requires the use of metal oxides which produce color. To use the stained-glass microbubbles in a matrix that is to be photopolymerized, the metal oxides preferably provide an ultraviolet window, as do cobalt or nickel oxide.

The average diameter of the stained-glass microbubbles of the invention should be from 5 to 200 micrometers. Stained-glass microbubbles having an average diameter below 5 micrometers would tend to be unduly expensive. In making tapes of the invention, it would be difficult to coat out a photopolymerizable mixture containing microbubbles having an average diameter above 200 micrometers. For economy in manufacturing the stained-glass microbubbles, their average diameter preferably is within the range of 20 to 80 micrometers.

The stained-glass microbubbles may comprise from 5 to 65 volume percent of the pressure-sensitive adhesive layer or other article of the invention. It would be unduly difficult to try to make a coherent and uniform article at more than 65 volume percent, whereas the advantages from using stained-glass microbubbles may not be significantly realized at less than 5 volume percent. Preferably from 10 to 55 volume percent of the pressure-sensitive adhesive layer or other article comprises stained-glass microbubbles.

The thickness of a pressure-sensitive adhesive layer or other article of the invention should exceed three times the average diameter of the microbubbles and twice the diameter of substantially every microbubble. In flexible articles such as pressure-sensitive adhesive tapes of the invention, this enhances migration of the stained-glass microbubbles within the matrix under applied pressure instead of breaking. In the tapes of the invention, this enables the adhesive to flow into intimate contact with rough or uneven surfaces, while retaining its foamlike character. Optimum performance in this respect is attained if the thickness of the pressure-sensitive adhesive layer or other article exceeds seven times the average diameter of the stained-glass microbubbles.

As taught in the aforementioned Levens patent, microbubble-filled adhesive layers of tapes of the invention can be economically produced at thicknesses as small as 0.1 mm and as great as 2.5 mm or more. When the thickness of the adhesive layer exceeds 1.0 mm, it may be desirable to coat the microbubble-filled, photopolymerizable monomers onto a carrier that transmits ultraviolet radiation so that the coating can be irradiated from both sides. The tapes are most useful at adhesive thicknesses between 0.4 and 1.0 mm.

Although the Levens patent teaches that the walls of its glass microbubbles should be very thin, it is difficult at the present time to make stained-glass microbubbles having an average density below about 0.2 g/cm$^3$. However, their average density preferably is less than 0.4 g/cm$^3$, and desirably less than 0.3 g/cm$^3$, both for economy and for ease of dispensing them into adhesive-producing monomers.

Also applicable to the manufacture of tapes of the invention are teachings of U.S. Pat. No. 4,415,615 (Esmay et al.) that tapes of the Levens patent may have a cellular pressure-sensitive adhesive matrix. See especially col. 5, lines 32-47 and Example 25. A tape of the present invention, the adhesive layer of which comprises stained-glass microbubbles in a cellular adhesive matrix, has substantially the same darkness as a tape which is identical except having a dense adhesive matrix.

A preferred pigment or dye is carbon black, which is useful in amounts ranging from about 0.04 to 0.15% by weight of the matrix, exclusive of the stained-glass microbubbles. Another preferred pigment or dye is crystal violet dye which has an ultraviolet window between 340 and 420 nm. It also should be useful in amounts ranging from about 0.04 to 0.15% by weight of the matrix. Preferably the amount of pigment or dye does not exceed 0.12% by weight of the matrix.

The matrix of a pressure-sensitive adhesive tape of the invention preferably comprises an acrylic polymer of acrylic acid ester of nontertiary alcohol, the molecules of which have from 1-14 carbon atoms, at least a major proportion of said molecules having a carbon-to-carbon chain of 4-12 carbon atoms terminating at the hydroxyl oxygen atom, said chain containing at least about one-half the total number of carbon atoms in the molecule, said acrylic acid ester being per se polymerizable to a sticky, stretchable elastic adhesive polymer mass. In order to enhance the internal strength of the adhesive matrix, the acrylic polymer may be a copolymer of said acrylic acid ester and one or more copolymerizable monoethylenically unsaturated monomers which have highly polar groups such as are present in acrylic acid, methacrylic acid, itaconic acid, acrylamide, methacrylamide, N-substituted acrylamides, acrylonitrile, methacrylonitrile, hydroxyalkyl acrylates, cyanoethyl acrylate, N-vinylpyrrolidone, and maleic anhydride. Generally such copolymerizable monomers should be used in amounts less than 20% by weight of the adhesive matrix so that the adhesive is tacky at ordinary room temperatures, except that such tackiness can be preserved at up to 50% by weight of N-vinylpyrrolidone. Larger amounts of such copolymerizable monomers would require the novel tape to be heated to make its adhesive matrix tacky and pressure-sensitive. The adhesive matrix may also include small amounts of other useful copolymerizable monoethylenically unsaturated monomers such as alkyl vinyl ethers, vinylidene chloride, styrene, and vinyltoluene. To further enhance the cohesive strength of the adhesive matrix, it may be made with a crosslinking agent such as 1,6-hexanediol diacrylate, with a photoactive crosslinking agent such as taught in U.S. Pat. Nos. 4,330,590 (Vesley) and 4,329,384 (Vesley et al.), or with a heat-activatable crosslinking agent such as a lower-alkoxylated amino formaldehyde condensate having $C_{1-4}$ alkyl groups, for example, hexamethoxymethyl melamine (available as "Cymel" 303 from American Cyanamide Co.) or tetramethoxymethyl urea (available as "Beetle" 65 from American Cyanamide Co.) or tetrabutoxymethyl urea ("Beetle" 85).

In making tapes of the invention by photopolymerization as taught in the aforementioned Levens patent, the photopolymerizable monomers may be partially polymerized to a coatable viscosity within the range of about 1000 to 40,000 cps before adding the stained-glass microbubbles. Alternatively, partial polymerization can be effected by heat. Viscosities within the range of 5,000 to 15,000 cps are preferred for ease of handling. Instead of being partially polymerized, the monomers can be mixed with a thixotropic agent such as fumed silica, followed by the coating and photopolymerizing steps. Regardless of the techniques used to achieve a coatable viscosity, it is desirable after storage to stir the mixture immediately prior to coating it out to insure uniform dispersion of the microbubbles.

The microbubble-containing matrix may be coated onto and polymerized against a flexible backing sheet which has a low-adhesion surface from which the polymerized layer is readily removable and almost always is self-sustaining. If the uncoated face of the backing sheet also has a low-adhesion surface, the backing sheet with its polymerized layer may be wound up in roll form for convenient storage and shipment.

In the current state of the art, photopolymerization preferably is carried out in an inert atmosphere such as nitrogen. Instead, an inert atmosphere can be achieved by temporarily covering the photopolymerizable coating with a plastic film which is transparent to ultraviolet radiation, and irradiating through that film in air. If the polymerizable coating is not covered during photopolymerization, the permissible oxygen content of the inert atmosphere can be increased by mixing into the photopolymerizable composition an oxidizable tin compound as taught in U.S. Pat. No. 4,303,485 (Levens), which also teaches that by doing so, thick coatings can be polymerized in air.

Where a tape of the invention is to be adhered to a surface to which its pressure-sensitive adhesive layer would not form a strong bond, it may be desirable to apply to one or both of its faces of its microbubble-filled adhesive layer, a layer of unfilled pressure-sensitive adhesive which is specially selected for its adhesion to that surface.

The following tests were used to evaluate tapes of the invention.

SHEAR VALUE

A strip of tape is adhered by its adhesive to a rigid stainless steel plate with an exactly 1.27-cm square portion of the tape in contact with the panel. Before testing, a 1000 g weight rests over the bonded area for 15 minutes. Then the panel with the adhered tape is placed in the oven which has been preheated to 70° C., and after 15 minutes a 500 gram weight is hung from the free end of the tape, with the panel tilted 2° from the vertical to insure against any peel forces. The time at which the weight falls is the Shear Value. If no failure, the test is discontinued at 10,000 minutes. Only cohesive failures are reported.

T-PEEL

T-Peel is measured as in ASTM D-1876-72 except that the test tapes were 0.5 inch (1.27 cm) in width and were tested only two hours after being adhered to aluminum foil backings. Results are reported in Newtons per decimeter (N/dm). Only cohesive failures are reported.

DARKNESS

The darkness of a pressure-sensitive adhesive layer is determined on a Hunter LabScan Spectrocolorimeter using a 10 degree reflectance, Illum=F and the CIE lab scale (L*a*b*) where L*=0 is black and L*=100 is white. Since a* and b* are usually between −5 and +5, they are not reported unless one of them is outside of that range.

PREPARATION OF STAINED-GLASS MICROBUBBLES

A number of glasses were prepared by mixing the formulations shown in Table I. Each mixture was melted in a refractory container in a furnace at the temperature and time shown in Table II. The molten mixture was quenched in water to give a frit which was recovered from the water and dried. A 500 g sample of the frit was milled with 6000 g of alumina grinding media for one-half hour. This milled material was classified to produce "feed" particles with a typical size distribution of 90% (by weight) smaller than 65 micrometers, 50% smaller than 30 micrometers and smaller than 10 micrometers. The particle size was determined using a Leeds and Northrup Microtrac Particle Size Analyser, Model 2991-01.

The "feed" particles were made into microbubbles by passing the particles through an air/gas flame (approximately stoichiometric 10:1) at the rate shown in Table II. The product yield and density are also reported in Table II.

TABLE I

| Stained glass | $SiO_2$ | $H_3BO_3$ | $CaCO_3$ | $Na_2CO_3$ | $K_2CO_3$ | $Li_2CO_3$ | $Na_4P_2O_7$ | $Na_2SO_4$ | Metal Carbonate | |
|---|---|---|---|---|---|---|---|---|---|---|
| | | | | (weight percentages) | | | | | | |
| A | 52.16 | 12.93 | 7.41 | 6.78 | 3.81 | 1.18 | 2.09 | 1.23 | $CoCO_3$ | 12.41 |
| B | 51.22 | 12.80 | 7.26 | 4.48 | 3.84 | 1.20 | 2.13 | 4.27 | $CoCO_3$ | 12.80 |
| C | 51.22 | 12.80 | 7.26 | 4.48 | 3.84 | 1.20 | 2.13 | 4.27 | $CoCO_3$ | 12.80 |
| D | 53.26 | 12.32 | 10.21 | 4.66 | 3.99 | 1.24 | 2.22 | 4.44 | $CoCO_3$ | 6.66 |
| E | 55.87 | 13.97 | 9.31 | 5.59 | 4.19 | 1.30 | 2.33 | 3.72 | $CoCO_3$ | 3.72 |
| F* | 51.28 | 12.82 | 6.41 | 4.27 | 3.85 | 1.28 | 2.14 | 3.42 | $CoCO_3$ | 6.41 |
| | | | | | | | | | $NiCO_3$ | 7.26 |
| G | 51.82 | 12.85 | 7.36 | 6.37 | 3.78 | 1.18 | 2.07 | 1.37 | $NiCO_3$ | 12.84 |
| H | 51.22 | 12.80 | 7.26 | 4.48 | 3.84 | 1.20 | 2.13 | 4.27 | $MnCO_3$ | 12.80 |
| I | 48.58 | 12.15 | — | 4.05 | 3.64 | 1.21 | 2.02 | 4.05 | $MnCO_3$ | 24.29 |
| J | 53.26 | 13.32 | 10.21 | 4.66 | 3.99 | 1.24 | 2.22 | 4.44 | $V_2O_5$ | 6.66 |
| K | 51.33 | 12.83 | 7.27 | 5.13 | 3.85 | 1.20 | 2.14 | 3.42 | $CoCO_3$ | 12.83 |
| L | 51.77 | 12.94 | 7.33 | 7.76 | 3.88 | 1.21 | 2.16 | — | $CoCO_3$ | 12.94 |

*also contains 0.86 $NaNO_3$

TABLE II

| | Preparation of Stained Glass | | Preparation of Stained-glass Microbubbles | | |
|---|---|---|---|---|---|
| Stained glass | Temp. (°C.) | Time (hr) | Rate (Kg/hr) | Yield (%) | Density (g/cm³) |
| A | 1296 | 3 | 3.24 | 82 | 0.38 |
| B | 1260 | 24 | 1.22 | 85 | 0.22 |
| C | 1271 | 3 | 3.24 | 88.5 | 0.26 |
| D | 1271 | 4 | 3.43 | 89 | 0.22 |
| E | 1271 | 4 | 2.58 | 80 | 0.24 |
| F | 1282 | 3 | 3.58 | 89.5 | 0.34 |
| G | 1282 | 3 | 3.61 | 85 | 0.30 |
| H | 1271 | 4 | 3.67 | 85 | 0.31 |
| I | 1271 | 4 | 3.97 | 86.5 | 0.47 |
| J | 1271 | 4 | 3.42 | 81.5 | 0.99 |
| K | 1271 | 4 | 3.46 | 87 | 0.31 |
| L | 1296 | 3 | 1.99 | 85 | 2.35* |

*Although Stained Glass L was processed the same as A–K, it formed only solid microspheres.

While the average density of Stained-glass Microbubbles A was 0.38 g/cm³, 76% by weight of the particles had a density of less than 1.0 g/cm and the remaining 24% had a density of more than 1.0 g/cm³. Although not measured, it is believed that the density distribution of each of Stained-glass Microbubbles B-I and K was approximately the same as that of Stained-glass Microbubbles A. The density distributions for Stained-glass Microbubbles A, J, and two batches of unstained microbubbles used in making comparative tapes (see Table V) are reported in Table III.

TABLE III

| | Density (g/cm³) | | Particle |
|---|---|---|---|
| | all particles | particles <1.0 g/cm³ | content <1.0 g/cm³ (%) |
| Stained-glass Microbubbles A | 0.38 | 0.30 | 76 |
| Stained-glass Microbubbles J* | 0.99 | 0.55 | 36 |
| First batch of unstained microbubbles | 0.15 | 0.12 | 79 |
| Second batch of unstained microbubbles | 0.37 | 0.29 | 75 |

*In examples below, only that portion of Stained-glass Microbubbles J which floated was used; the density of that portion was 0.61.

Transmission characteristics of the glass of each of Stained-glass Microbubbles C and G were measured from broken pieces of large glass bubbles averaging about 0.2 mm in thickness. Results are indicated in Table IV.

TABLE IV

| Wavelength (nm) | % Transmission of Glass of Stained-glass Microbubbles | |
|---|---|---|
| | C | G |
| 300 | 50 | 65 |
| 320 | 60 | 68 |
| 340 | 66 | 84 |
| 360 | 69 | 85 |
| 380 | 71 | 82 |
| 400 | 72 | 58 |
| 420 | 70 | 34 |
| 440 | 66 | 25 |
| 460 | 56 | 28 |
| 480 | 40 | 35 |
| 500 | 27 | 42 |
| 550 | 25 | 52 |
| 600 | 1 | 58 |
| 650 | 2 | 60 |
| 700 | 66 | 88 |
| 750 | 79 | 80 |

In the following examples, all parts are by weight.

EXAMPLE 1

A syrup of coatable viscosity was prepared by partially polymerizing, as taught in U.S. Pat. No. 4,330,590 (Vesley), a mixture of 87.5 parts isooctyl acrylate, 12.5 parts acrylic acid, and 0.04 part of 2,2-dimethoxy-2-phenyl acetophenone ("Irgacure" 651). To this syrup was added an additional 0.1 part of "Irgacure" 651 and 0.05 part of hexanedioldiacrylate, plus glass microbubbles and carbon black pigment. The carbon black was added as 24% solids dispersed in isobornylacrylate (obtained from PenColor). The carbon black solids are indicated in Table IV in terms of percentage by weight of the adhesive matrix. The resulting mixture was thoroughly mixed slowly with an air stirrer and carefully degassed in a desiccator using a vacuum pump.

To make each tape of Example 1, the mixture was fed to the nip of a knife coater between a pair of transparent, biaxially-oriented polyethylene terephthalate films, the facing surfaces of which had low-adhesion coatings. The knife coater was adjusted to provide a coating thickness of approximately 0.10 to 0.12 mm. The composite emerging from the roll coater was irradiated with a bank of lamps, 90% of the emissions of which were between 300 and 400 nm with a maximum at 351 nm. The exposure was measured by an International Light "Light Bug" which is spectrally responsive between 250 and 430 nm, maximum 350 nm. The composite was cooled by blowing air against both films during the irradiation to keep the temperature of the films below 85° C. to avoid wrinkling of the films.

The resulting tapes were tested as reported in Table V, which lists the proportions of microbubbles in each tape in terms of both weight ("% wgt") and volume ("% vol").

It was surprising that the T-Peel of Tape 12 exceeds that of Tape 5 since the higher loading of carbon black would have been expected to inhibit the ultraviolet radiation and hence the curing.

TABLE V

| Tape | Microbubbles Glass | (% wgt) | (% vol) | Carbon black (% wgt) | Exposure (mj) | Adhesive Color | Darkness (L*) | Shear Value (min.) | T-Peel (N/dm) |
|---|---|---|---|---|---|---|---|---|---|
| 1 | unstained | 7.25 | 33 | 0 | 1000[a] | white | 94 | 10,000 | 525 |
| 2 | unstained | 2.83 | 16 | 0.043 | 1000[a] | gray | 33 | 10,000 | 482 |
| 3 | unstained | 7.25 | 16 | 0.043 | 1000[a] | gray | 38 | 10,000 | 596 |
| 4 | unstained | 7.25 | 33 | 0.043 | 1000[a] | light gray | 45 | 10,000 | 350 |
| 5 | unstained | 7.25 | 33 | 0.086 | 1000[a] | gray | 36 | 10,000 | 179 |
| 6 | unstained | 7.25 | 33 | 0.18 | 1000[a] | dark gray | 28 | 9 | 90 |
| 7 | unstained | 7.25 | 33 | 0.18 | 700[b] | black | 25 | 12 | 232 |
| 8 | unstained | 7.25 | 33 | 0.18 | 1000[b] | black | 25 | 433 | 275 |
| 9 | C | 4.7 | 16 | 0.043 | 1000[a] | black | 20[c] | AF | — |
| 10 | A | 7.25 | 16 | 0.043 | 700[b] | black | 28[d] | 10,000 | 508 |
| 11 | C | 7.25 | 22 | 0.043 | 1000[a] | blue | 32[e] | 10,000 | — |
| 12 | C | 7.25 | 21 | 0.12 | 700[b] | black | 26 | 10,000 | 267 |
| 13 | B | 7.25 | 25 | 0.072 | 700[b] | black | 23[f] | 10,000 | 378 |
| 14 | A | 16.6 | 29 | 0.069 | 1000[a] | blue-black | 31[g] | 10,000 | 338 |
| 15 | A | 16.6 | 29 | 0.043 | 800[a] | blue-black | 34[h] | 10,000 | 426 |
| 16 | D | 7.25 | 24 | 0.072 | 700[b] | dark blue-gray | 38[i] | 10,000 | — |
| 17 | E | 7.25 | 23 | 0.12 | 700[b] | dark gray | 31 | 10,000 | — |
| 18 | G | 7.25 | 19 | 0.043 | 1000[a] | brown-gray | 40 | 10,000 | 452 |
| 19 | F | 7.25 | 17 | 0.043 | 1000[a] | dark blue-gray | 31 | 10,000 | 547 |
| 20 | F | 16.3 | 32 | 0.043 | 1000[a] | blue-gray | 37 | 10,000 | 422 |
| 21 | G | 7.25 | 19 | 0 | 1000[a] | tan | 54[j] | 10,000 | — |
| 22 | A | 7.25 | 16 | 0 | 1000[a] | blue | 31[k] | 10,000 | — |
| 23 | F | 7.25 | 16 | 0 | 1000[a] | blue-gray | 38[m] | 10,000 | — |
| 24 | H | 7.0 | 19 | 0 | 700[b] | light pink | 70[n] | AF | — |
| 25 | I | 7.0 | 13 | 0 | 700[b] | pink | 61[p] | AF | — |
| 26 | I | 7.0 | 13 | 0.096 | 700[b] | black | 20 | AF | 455 |

[a] Total exposure (irradiated from one side).
[b] Irradiated in reported amount from each side.
[c] $a^* = -0.3$; $b^* = -10$
[d] $a^* = 0.0$; $b^* = -10.5$
[e] $a^* = -0.3$; $b^* = -14$
[f] $a^* = 0.6$; $b^* = -11$
[g] $a^* = -0.4$; $b^* = -10$
[h] $a^* = 0.0$; $b^* = -14$
[i] $a^* = 3.2$; $b^* = -26$
[j] $a^* = -3.3$; $b^* = 13$
[k] $a^* = 9.4$; $b^* = -40$
[m] $a^* = -1.8$; $b^* = -12$
[n] $a^* = 5.1$; $b^* = 10$
[p] $a^* = 7.2$; $b^* = 13$
AF Adhesive failure

Tape 27

A pressure-sensitive adhesive tape was prepared using the same unstained microbubbles as in Tape 2, except at 7.0% by weight, and the carbon black was replaced by a red pigment, namely PDI Red #3593 (added as 15% solids in a polyester of 250 average molecular weight).

Tape 28

Tape 28 was made the same as Tape 27 except replacing the unstained microbubbles with Stained-glass Microbubbles I.

Tapes 29–30

Tapes 29–30 employed the floated portion of Stained-glass Microbubbles J (density 0.61 g/cm$^3$) and differed from the above tapes in that the ratio of isooctyl acrylate to acrylic acid was 90:10.

Tape 31

Tape 31 was made the same as Tape 1 except the adhesive matrix contained 0.1% of crystal violet dye.

Tape 32

Tape 32 was made the same as Tape 10 except it contained 0.1% of crystal violet dye in place of carbon black.

Tape 33

Tape 33 was made the same as Tape 9, except using 8.0% by weight of Stained-glass Microbubbles C, 0.091% of carbon black, and 0.75% of Surfactant C and 1.0% of Surfactant B of U.S. Pat. No. 4,415,615 (see bottom of col. 7). The unpolymerized adhesive mixture was frothed and polymerized by the "Typical Tape-making Procedure" at col. 6 of that patent. The resulting tape had an adhesive layer comprising stained-glass microbubbles dispersed in a cellular pressure-sensitive adhesive matrix. The cellular adhesive layer had the expected foam properties and a density of 560 kg/m$^3$.

Tape 34

After peeling off one of the transparent films of Tape 33 to expose its cellular adhesive layer, a noncellular pressure-sensitive adhesive transfer tape was laminated to the cellular layer using a hard rubber roller. The adhesive transfer tape was a pressure-sensitive acrylate copolymer adhesive of the type disclosed in U.S. Pat. No. 24,906. Its thickness was 0.05 mm. This 2-layer-adhesive tape product was tested for peelback at 180° C.* as follows: from its noncellular face, 141 N/dm; from its cellular face, 103 N/dm.

*=peelback at 180° from a stainless steel plate measured by attaching the free end of the tape to a scale and moving the plate away from the scale at a rate of about 3.8 cm/sec.

Tape 35

A syrup of coatable viscosity was prepared by partially polymerizing a mixture of 70 parts of isooctyl acrylate, 30 parts of N-vinyl-pyrrolidone, and 0.04 part of 2,2-dimethoxy-2-phenyl acetophenone ("Irgacure" 651). To this syrup was added an additional 0.1 part of "Irgacure" 651, 0.05 part of hexanedioldiacrylate, 7.25 parts of Stained-glass Microbubbles B, and 0.043 part carbon black pigment. This syrup was coated and polymerized as was Tape 1.

Testing of Tapes 27–33 and 35 is reported in Table VI.

TABLE VI

| Tape | Microbubbles Glass | (% wgt) | (% vol) | Carbon black (% wgt) | Exposure (mj) | Adhesive Color | Darkness (L*) | Shear Value (min.) | T-Peel (N/dm) |
|---|---|---|---|---|---|---|---|---|---|
| 27 | unstained | 7.0 | 16 | 0 | 700$^b$ | light red | 52$^q$ | AF | 512 |
| 28 | I | 7.0 | 13 | 0 | 700$^b$ | dark red | 42$^r$ | AF | 470 |
| 29 | J | 7.0 | 11 | 0 | 1000$^b$ | tan | 56$^s$ | 10,000 | 557 |
| 30 | J | 7.0 | 11 | 0.048 | 1000$^b$ | black | 25 | 10,000 | 483 |
| 31 | unstained | 7.25 | 33 | 0 | 700$^b$ | violet | 30$^t$ | 10,000 | 438 |
| 32 | A | 7.25 | 21 | 0 | 700$^b$ | dark violet | 25$^u$ | 10,000 | 492 |
| 33 | C | 8.00 | 22 | 0 | 700$^b$ | black | 27 | 10,000 | 417 |
| 35 | B | 7.25 | 33 | 0 | 1000$^b$ | black | 24$^v$ | 10,000 | 293 |

$^q$a* = 43; b* = 19
$^r$a* = 31; b* = 15
$^s$a* = −4; b* = 17
$^t$a* = 22; b* = −53
$^u$a* = 15; b* = −42
$^v$a* = −0.4; b* = −11

Stained-glass Microbubbles Useful as Pigments

The adhesive layers of Tapes 21–25 and 27–29 did not have a dark appearance and so would not camouflage the presence of the tapes in most uses described above under "Background Art". However, the colors of those tapes were esthetically pleasing, and each tape would present an elegant and possibly camouflaged appearance when applied to a surface of the same or a complementary color.

The aforementioned Howell U.S. Pat. No. 4,391,646 teaches that glass microbubbles can readily be uniformly dispersed into plastics by extrusion or injection molding (e.g., see col. 8, lines 19–31). It is demonstrated hereinabove that glass microbubbles made of stained glass can readily be uniformly dispersed into the adhesive layer of a pressure-sensitive adhesive tape, and Tapes 21–25 and 27–29 show that stained-glass microbubbles when so used produce an esthetically pleasing effect. Stained-glass microbubbles can be dispersed as pigments into a variety of additional materials such as polyurethanes, rubbers such as polychloroprene, polyethylene and other thermoplastics, alkyds and other paint vehicles, epoxy resins and other thermosetting plastics. The Comparative Test below shows that stained-glass microbubbles afford surprisingly good opacity or hiding power when dispersed as pigments throughout normally transparent articles made with materials such as those mentioned in the preceding sentence. For example, stained-glass microbubbles can afford both esthetically pleasing color and good opacity to plastic auto body parts, such as fenders and doors, while also greatly reducing body weight. Inasmuch as stained-glass microbubbles can be of much lower cost on a volume basis as compared to many widely used materials into which they may be dispersed, they can also afford cost reduction.

As compared to many pigments now on the market, stained-glass microbubbles have the advantage of being completely inert and thus can be used to pigment materials which are either highly acidic or highly basic. Articles and coatings pigmented with stained-glass microbubbles will retain their original color against prolonged weathering as long as the material of the article or coating does not itself deteriorate.

Metal oxides used in making glass from which stained-glass microbubbles may be formed produce colors as indicated below:

| | |
|---|---|
| cobalt | blue |
| nickel | tan |
| manganese | pink |
| chromium | green |
| vanadium | tan |
| copper | green |
| cadmium | yellow |
| selenium-cadmium | orange |

See D. C. Boyd and D. A. Thompson: "Glass", Encyclopedia of Chemical Technology, vol. II, 3rd Edition, Kirk Othmer, ed, John Wiley & Sons, p. 845.

Comparative Test

Stained-glass Microbubbles K were screened to pass 200-mesh screen (74-micrometer openings) in order to achieve a average diameter close to that of solid Glass Microspheres L as follows:

| | Stained-glass Microbubbles K | Solid Glass Microspheres L |
|---|---|---|
| Average diameter (micrometers) | 47 | 36 |
| Density (g/cm$^3$) | 0.31 | 2.35 |

Each was used to make a tape as in Example 1, except that to try to counteract the tendency of Solid Glass Microspheres L to agglomerate, that filled syrup was run several times through a hand homogenizer prior to coating. Properties of the adhesive layer of the resulting tapes were:

| | Tapes with Stained-glass Microbubbles K | | | Tape with Solid Glass Microspheres L |
|---|---|---|---|---|
| | #36 | #37 | #38 | |
| Weight % glass | 0.95 | 3.0 | 7.25 | 7.25 |
| Volume % glass | 3.1 | 9.1 | 19.5 | 3.1 |
| L* | 59 | 39 | 36 | 31 |
| a* | −0.4 | 5.4 | 4.4 | 8.3 |
| b* | −25 | −40 | −32 | −37 |
| Density (g/cm$^3$) | 0.98 | 0.93 | 0.86 | 1.13 |

When the four tapes were laid (with both polyester film coverings) on a typewritten sheet, the typing could be read through the tape containing the solid microspheres but was completely invisible through Tape #38, and only the outlines of the words could be seen through Tape #37, thus demonstrating the surprisingly good hiding power of the stained-glass microbubbles. The typing when viewed through Tape #36 was somewhat less obscure than when viewed through the tape made with Solid Glass Microspheres L.

Example 2

Stained-glass Microbubbles A (5.8 g) were dry-blended with linear, low-density polyethylene (58 g) having a melt index of one [Union Carbide 7047]. The blend was extruded through an orifice of 6.35 mm diameter at temperatures of 193° C. (inlet) and 221° C. (outlet) and a pressure of 10341 kPa. This produced an opaque flexible rod having a uniform cobalt blue color and a density of 0.845 g/cm$^3$.

Example 3

To 10 g of an isocyanate prepolymer ("Hypol 3000" of WR Grace) was added 10 g of tap water containing 1 g of Stained-glass Microbubbles C. This was stirred by hand at room temperature until a foam had formed, throughout which the microbubbles were thoroughly dispersed as evidenced by a uniformly light blue color.

EXAMPLE 4

A syrup of coatable viscosity was prepared by partially polymerizing a mixture of 70 parts of isooctyl acrylate, 30 parts of acrylic acid, and 0.04 part of 2,2-dimethoxy-2-phenyl acetophenone ("Irgacure" 651). To this syrup was added an additional 0.1 part of "Irgacure" 651, 0.05 part of hexanedioldiacrylate, and 7 parts of Stained-glass Microbubbles B. This syrup was coated and polymerized in the same manner as were the adhesive layers of the tapes of Example 1. The transparent films were peeled off, leaving a brittle, nontacky plastic film which had a thickness of 1.1 mm, a pleasant blue color (L*=37, a*=13, b*=−36), and density of 0.84 g/cm$^3$.

EXAMPLE 5

A syrup was prepared as in Example 4, except also including 0.072 part of carbon black. The syrup was polymerized to provide a brittle, nontacky plastic film which had a thickness of 1 mm, a black color (L*=26), and a density of 0.85 g/cm$^3$.

EXAMPLE 6

Into 10 g of a hydroxy-functional polyol ("Lexorez 3500-140" of Inodex) was mixed 1.5 g of Stained-glass Microbubbles B and then a mixture of 5 g of isocyanate prepolymer ("Desmodur N-100" of Mobay Chemical Corp.) plus 0.005 part of dibutyl tin dilaurate. This was poured into a Petri dish, degassed, and then cured in an oven at 170° C. for 15 minutes to provide a tough, rubbery sheet having a thickness of about 3 mm, a pleasant blue color (L*=35, a*=12, b*=−34), and a density of 0.61 g/cm$^3$.

EXAMPLE 7

One part of stained-glass Microbubbles B were mixed into 20 parts of a clear lacquer (20% solids) which would by itself dry to a satin finish ("Floquill" crystal coat). The mixture was painted onto an aluminum surface and dried to provide a pleasant opaque blue color.

We claim:

1. A coherent article comprising a polymeric matrix filled with glass microbubbles comprising at least 5 volume percent of the polymeric matrix, wherein the improvement comprises:
the microbubbles have an average diameter of from 5 to 200 micrometers and are stained glass, said stained glass containing metal oxides which produce a colored appearance, and dispersed throughout the polymeric matrix is a pigment or dye comprising from 0.04 to 0.12% by weight of the polymeric matrix.

2. An article as defined in claim 1 wherein the stained glass of the microbubbles has an ultraviolet window.

3. An article as defined in claim 2 wherein the average density of the stained-glass microbubbles is less than 0.4.

4. An article as defined in claim 1 wherein the microbubbles comprise from 10 to 65 volume percent of the article.

* * * * *